United States Patent
Chin et al.

(10) Patent No.: US 8,027,319 B2
(45) Date of Patent: Sep. 27, 2011

(54) METHODS AND SYSTEMS FOR WIRELESS NUMBER PORTABILITY WITHOUT WNP QUERY

(75) Inventors: Frances Chin, Naperville, IL (US); Peggy Hasan, Aurora, IL (US); Sandra L. True, St. Charles, IL (US); Huixian Song, Naperville, IL (US)

(73) Assignee: Alcatel Lucent, Paris (FR)

( * ) Notice: Subject to any disclaimer, the term of this patent is extended or adjusted under 35 U.S.C. 154(b) by 1209 days.

(21) Appl. No.: 11/458,510

(22) Filed: Jul. 19, 2006

(65) Prior Publication Data
US 2008/0037759 A1    Feb. 14, 2008

(51) Int. Cl.
*H04W 4/00* (2009.01)

(52) U.S. Cl. .............. 370/338; 379/221.13; 379/114.27; 379/88.2; 379/127.01; 379/213.01; 455/461; 455/551; 455/415; 455/428; 455/433; 455/417; 370/313; 370/355; 370/360

(58) Field of Classification Search ............. 379/221.13, 379/114.27, 213.01, 127.01; 455/461, 551, 455/417, 415, 428, 433; 370/338, 313, 355, 370/360

See application file for complete search history.

(56) References Cited

U.S. PATENT DOCUMENTS

| | | | |
|---|---|---|---|
| 5,717,748 | A | 2/1998 | Sneed, Jr. et al. |
| 5,717,749 | A | 2/1998 | Sneed, Jr. et al. |
| 5,883,948 | A | 3/1999 | Dunn |
| 5,910,981 | A | 6/1999 | Bhagat et al. |
| 6,359,980 | B1 | 3/2002 | Petrelli et al. |
| 6,611,831 | B1 | 8/2003 | Dunn et al. |
| 7,020,267 | B2 | 3/2006 | Kryvossidis et al. |
| 7,398,087 | B1 * | 7/2008 | McConnell et al. ....... 455/435.1 |
| 2004/0053610 | A1 * | 3/2004 | Kim ........................ 455/432.1 |
| 2004/0242243 | A1 * | 12/2004 | Luis .............................. 455/461 |
| 2006/0205404 | A1 * | 9/2006 | Gonen et al. ............... 455/432.1 |

OTHER PUBLICATIONS

TIA/EIA-41-D Enhancements for Wireless Number Portability Phase II, TIA Standard, TIA-756-A, Telecommunications Industry Association, Jan. 2002.

* cited by examiner

*Primary Examiner* — Kamran Afshar
*Assistant Examiner* — Khalid Shaheed
(74) *Attorney, Agent, or Firm* — Fay Sharpe LLP

(57) ABSTRACT

Methods and systems are presented for implementing wireless number portability in a wireless communications network, in which an originating switching component determines whether a called number is ported or not based on profile information from a home location register without querying a number portability database.

19 Claims, 2 Drawing Sheets

METHODS AND SYSTEMS FOR WIRELESS NUMBER PORTABILITY WITHOUT WNP QUERY

BACKGROUND OF THE INVENTION

The present invention is related generally to wireless telecommunications, and more particularly to supporting wireless number portability (WNP). When a customer is initially assigned a wireless phone number by an original service provider, the number is assigned from a block of numbers associated with the service provider and the customer's geographical location. When the customer moves to a new service provider, the customer's phone number is 'ported' to the new service provider. Number portability allows a user to change service providers for mobile communications while keeping their mobile directory number (MDN), and is therefore popular among wireless service customers. Wireless number portability standards have been established by various industry bodies, including the Cellular Telecommunications Industry Association (CTIA), in which a wireless number portability (NP) database is maintained with entries of ported mobile directory numbers and corresponding location routing numbers (LRNs) for access by switching components operated by various wireless service providers. The home or anchor switch in the original service provider's network maintains a local ported number database or table with entries corresponding to 1000 number blocks that include at least one number that has been ported to another service provider. When a call is placed to a ported wireless number, the originating switch receives the call and queries the local ported number database to determine whether the called number is portable (possibly ported). If the called number is within a 1000 number block identified in the local ported number database, the switch sends a WNP query invoke message through the network to the common number portability (NP) database at a number portability service control point (NP-SCP). If this NP database includes an entry for the called number, the corresponding LRN is returned to the originating switch, which then routes the call to the receipt switch associated with the LRN, along with one or more parameters indicating that the call is to a ported number. This WNP service standard therefore requires construction and maintenance of the NP-SCP on the network, which is an extra cost to the service provider. Moreover, the queries to the NP database take time and occupy system resources to determine whether a portable number is indeed ported. Thus, there is a need for improved systems and methods for supporting WNP services in a wireless network without maintaining a common number portability database and without requiring the originating switch to perform excessive network queries to determine whether a called number is ported.

SUMMARY OF THE INVENTION

The following is a summary of one or more aspects of the invention provided in order to facilitate a basic understanding thereof, wherein this summary is not an extensive overview of the invention, and is intended neither to identify certain elements of the invention, nor to delineate the scope of the invention. The primary purpose of the summary is, rather, to present some concepts of the invention in a simplified form prior to the more detailed description that is presented hereinafter. The various aspects of the present invention relate to systems and methods for providing wireless number portability functionality without requiring creation and maintenance of a network number portability service control point and database, while allowing an originating switch to determine whether a called number is ported without invoking an extra query on a network database. The various aspects of the invention may be easily implemented in existing traditional network configurations by software upgrades to existing switching components, such as MSCs or the like, and advantageously operates to simplify call processing without maintenance of a local ported number database or table in the switch and without WNP database queries across the network. Instead, a home location register (HLR) entry associated with the originating switch is provisioned with an indicator, such as a flag, indicating whether or not a given MDN is ported, and if so, the entry also includes the corresponding LRN for routing calls to the ported number via the new service provider. Thus, when the originating switch receives an incoming call, a normal location request is sent to the HLR, which then returns the profile information, which includes an indication of whether the number is ported, and if so, the LRN. The switch then uses the LRN to route the call to the receipt switch associated with the LRN without having to maintain and consult a local ported number database and without doing any further network database queries. In one exemplary embodiment, immediate call forwarding (ICF) functionality is expanded to provide intelligent expeditious support for wireless number portability, in which the HLR returns an immediate call forwarding feature indicator in response to the normal call termination location request, as well as a forward-to-number. A new call type is defined in the switch that is used to allow the switching component to distinguish the WNP call forwarding from normal immediate call forwarding in digit analysis. For normal immediate call forwarding, the HLR returns the forward-to number in response to the location request. If the number is ported, however, the HLR provides the LRN in the forward-to field of the response, and uses the ICF flag field as an indication that the number is ported. Upon receipt, the originating switch determines from the call type that the call involves WNP call forwarding, and accordingly provides all the WNP related information in the outgoing signaling message sent to the receipt switch. The invention can therefore be advantageously employed to eliminate the NP-SCP network element required in the standard WNP network architecture and to simplify the network configuration and MSC call processing to reduce network equipment and maintenance costs.

In accordance with one or more aspects of the invention, a method is provided for implementing WNP services at an originating switching component, such as an MSC. The method includes receiving an incoming call to a called number, obtaining profile information associated with the called number, and determining whether the called number is a ported number based on the profile information. The method may further include routing the incoming call to a receipt switching component according to the profile information. In one implementation, the profile information is obtained from an HLR and includes an LRN in a forward-to field, where the originating switch routes the call to a receipt switch according to the location routing number based on a call type in the profile information that indicates that the forward-to field includes location routing information for a ported number. The profile may also include a ported number indicator in an immediate call forwarding field. The originating switch may update the HLR records or entries corresponding to ported numbers to include the ported number indicator and the location routing number, such as in the ICF and forward-to fields used for normal immediate call forwarding.

In accordance with further aspects of the invention a switching component is provided, which comprises means for receiving an incoming call to a called number, means for obtaining profile information associated with the called number, and means for determining whether the called number is a ported number based on the profile information. The switch may also include means for routing the incoming call to a receipt switching component according to the profile information.

Other aspects of the invention relate to a WNP system that includes an originating switching component operatively coupled with a wireless network to receive incoming calls to a called number, and an HLR that is coupled with the switch and which stores profile information associated with the called number. The originating switch obtains the profile information associated with the called number from the home location register and determines whether the called number is a ported number based on the profile information. The originating switch may also operate to route the call to a receipt switching component according to the profile information, where the profile information may include a ported number indicator, a location routing number in a forward-to field, and a call type indicating that the forward-to field includes location routing information for a ported number.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings. The present invention may be embodied in the construction, configuration, arrangement, and combination of the various system components and acts or events of the methods, whereby the objects contemplated are attained as hereinafter more fully set forth, specifically pointed out in the claims, and illustrated in the accompanying drawings in which:

DETAILED DESCRIPTION

Figure 1:
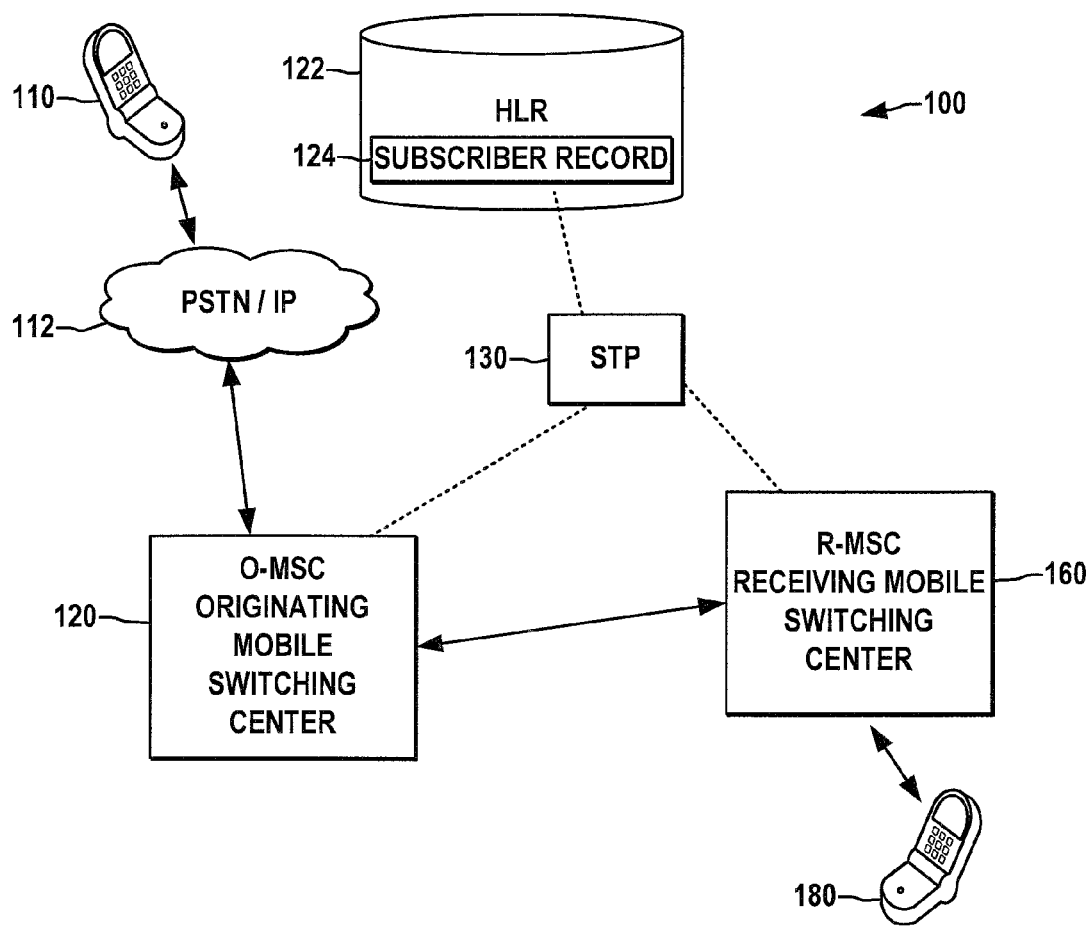
FIG. 1 is a high level schematic diagram illustrating an exemplary telecommunications system with a WNP system in accordance with one or more aspects of the present invention.

Referring now to the figures, wherein the showings are for purposes of illustrating the exemplary embodiments only and not for purposes of limiting the claimed subject matter, FIG. 1 schematically illustrates a communications system 100 into which the presently described embodiments may be incorporated or in which various aspects of the invention may be implemented. Several embodiments or implementations of the various aspects of the present invention are hereinafter illustrated and described in conjunction with the drawings, wherein like reference numerals are used to refer to like elements throughout and wherein the figures are not necessarily drawn to scale. The system 100 may include various operationally interconnected networks of various topologies, including wireless network components along with PSTN and packet switched (IP) networks 112 from which an incoming call may be placed by a first mobile unit 110 to a second mobile 180. The PSTN/IP networks 112 are operatively coupled with an originating switch, in this case a mobile switching center (MSC) 120 which in this case is an originating MSC (O-MSC) with respect to the called mobile station 180.

A second MSC 160 is also illustrated, in this case a receipt MSC (R-MSC) with respect to the mobile 180. The system 100 further includes a signal transfer point 130 and a home location register (HLR) 122 operatively associated with the O-MSC 120 and storing a subscriber record or entry 124 including various subscriber information, device status, the subscriber's mobile directory number (MDN), subscribed features (call forwarding, call waiting, voice-mail, and other features selected by the subscriber as part of the mobile service plan) and the HLR 122 also maintains information regarding the location of mobiles that may have roamed and registered with other (serving) MSCs. The HLR 122 may be shared by more than one MSC of a given service provider, and the HLR 122 is generally managed by the wireless service provider company and represents the "home" database of subscribers who have subscribed for the wireless service in that home area served by the wireless service provider. In the illustrated example, the HLR 122 is the home database for mobiles served by a first service provider that operates the originating MSC 120, whereas the second MSC 160 is operated by a second (i.e. different) service provider.

The system 100, moreover, may include various visitor location registers (VLRs) and other components and elements (not shown), for providing telecommunications services to a multitude of wireless and wireline communications devices, wherein only certain exemplary elements are illustrated in Fig. so as not to obscure the described aspects of the present invention. In general, the various components of the system 100 communicate with one another using one or more protocols as are known for providing mobile communications for exchanging voice, data, video or any other information exchanged between various communications devices such as the mobiles 110, 180, wherein the mobiles 110, 180 include wireless terminals to access network services over a radio interface and may be portable units, phones or computers installed in a vehicle, or may be positioned in fixed locations.

In the example situation depicted in FIG. 1, the owner of the mobile station 180 originally subscribed to wireless services from the first service provider and was serviced by the MSC 120 as a home or anchor MSC. Subsequently, the subscriber changed service providers to the operator of the second MSC 180, while choosing to retain the original MDN. At this point, the MDN is thus a ported number, and consequently the first MSC 120 is referred to in this context as the originating MSC (O-MSC) with respect to the mobile 180, and the second MSC 160 is the receiving or receipt MSC (R-MSC).

Notably absent from the system 100 is a number portability database, wherein the various aspects of the invention may be employed in providing wireless number portability without the need for local ported number tables or databases at the MSCs 120, 160, and without requiring a network based number portability (NP) database or service control point as was the case with conventional NP implementations. Moreover, the methods and systems of the present invention do not require network messaging for queries to centralized databases for supporting WNP service functionality, whereby the network overhead and call delays are mitigated for calls to ported numbers. The NP aspects of the invention are illustrated and described in the context of the exemplary system 100 that includes MSC type switching elements, wherein the invention may be practiced using any type or form of switching component or element of a wireless communications network or system.

Figure 2:
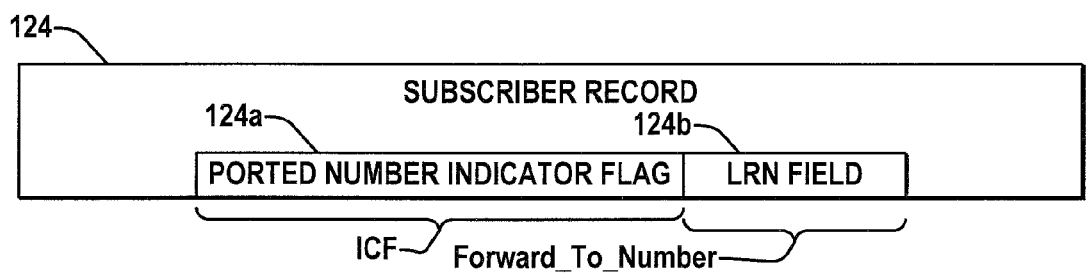
FIG. 2 is a schematic diagram illustrating further details of a subscriber record including a ported number indicator flag and an LRN in the system of FIG. 1.

Referring also to FIG. 2, in the exemplary embodiments, the HLR subscriber record 124 for the ported mobile 180 includes the normal information maintained for mobile subscribers, as well as ported number indicators 124a and location routing numbers (LRNs) 124b for subscribers whose MDNs have been ported to another service provider. In one possible embodiment, moreover, the ported number indicator is a flag that populates an immediate call forwarding (ICF) field of the record 124 and the LRN is provisioned in a "forward-to" field for ported numbers, wherein the O-MSC 120 implements either regular immediate call forwarding functionality for calls to non-ported numbers, or WNP type forwarding to the receipt MSC 160 for calls to the mobile 180 or to other ported numbers using the data in the forward-to field, for example, a WNP prefix digit string plus the MDN.

With the record 124 thus constructed in the HLR 122 associated with the O-MSC 120 from which the mobile 180 was ported out, the O-MSC 120 is provided with the necessary information to quickly implement WNP functionality without having to consult an external NP database, whereby a central NP database is not needed. In the illustrated situation, the MDN for the mobile 180 is ported out and the O-MSC 120 has caused the corresponding HLR record 124 to be provisioned with the ported number indicator flag 124a set and with the LRN 124b populated in the forward-to number field of the record 124. Other network elements may be used to initially provision the HLR record 124 for the ported number, and the user profile information from which the O-MSC 120 determines number portability and routing destination can be alternatively stored in other locations in the HLR or in another database accessible by the O-MSC 120.

Figure 3:
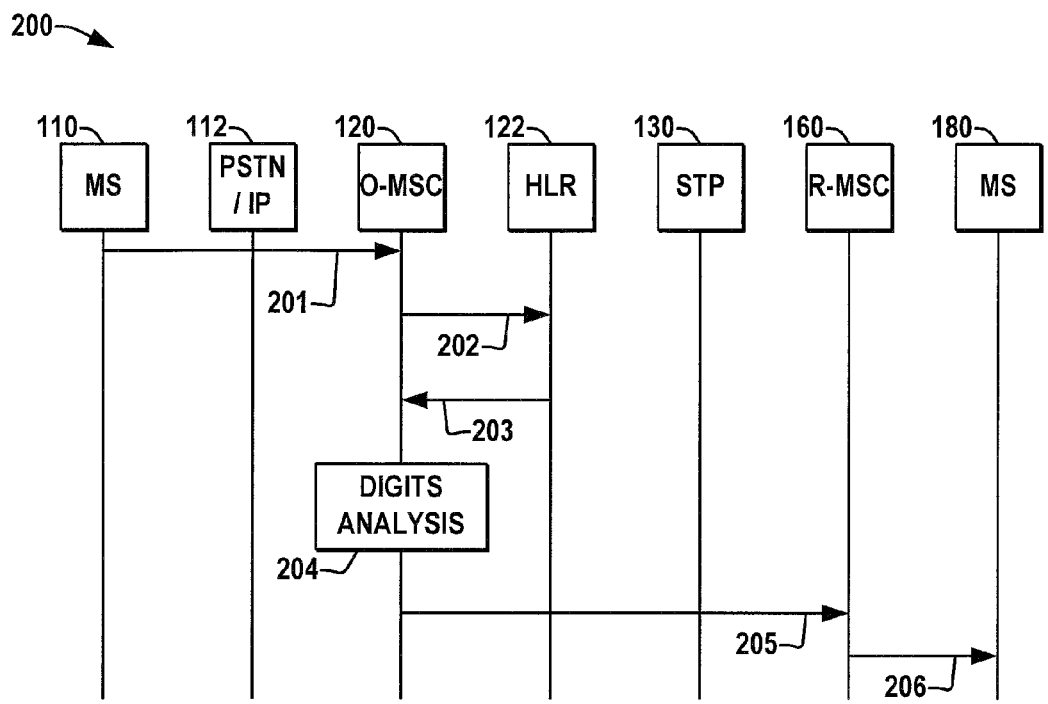
FIG. 3 is a call flow diagram illustrating call processing of a ported number in the system of FIGS. 1 and 2.

Referring now to FIG. 3, an exemplary call flow 200 is provided to illustrate the number portability operation of the system 100 for an incoming call 201 from mobile station 110 to the ported mobile 180, wherein the incoming call 201 comes in to the O-MSC 120 from the PSTN/IP networks 112 and is ultimately delivered to the mobile at 206 by the receipt MSC (R-MSC) 160. In operation, the profile information associated with the called (ported) number is obtained by the O-MSC 120, which then determines whether the called number is a ported number based on the profile information. Notably, this requires no query to an NP database. In a preferred implementation, moreover, the profile information is passed from the HLR 122 to the O-MSC 120 using a normal location request operation for an incoming call. Other embodiments are possible where the HLR record 124 includes profile information of any form by which an O-MSC 120 can determine that a corresponding MDN is ported or not, and based on which the call may be properly forwarded. Still other possibilities include the O-MSC 120 obtaining the necessary profile information from other sources. The exemplary embodiment, however, advantageously uses existing fields in the subscriber record 124 and also contemplates a new call type by which the O-MSC 120 can differentiate between regular call forwarding and WNP type forwarding.

As shown in FIG. 3, the incoming call 201 is received by the originating switching component O-MSC 120, which then performs a standard query of the HLR to obtain the record 124, including the O-MSC 120 sending a location request invoke message 202 to the HLR 122. The HLR 122 responds with a location request return result message 203 to the O-MSC 120, which includes the record 124 of FIG. 2, in particular, including the ICF flag field active to provide the ported number indication 124a and with the forward-to number field 124b provisioned with the WNP prefix digit string and the MDN of the ported mobile 180. The O-MSC 120 performs digit analysis at 204 on the profile information received form the HLR 122 including verifying that the ICF flag 124a is set and analyzing the forward-to number field 124b, from which the O-MSC 120 determines that the call is a WNP forward call by checking the call type. The O-MSC 120 accordingly sets WNP related information in the outgoing signaling message (e.g., JIP, FCI, etc. in IAM for SS7 ISUP signaling in one implementation), and routes the call at 205 to the R-MSC 160 based on the forward to number (LRN). The R-MSC 160, in turn, locates the called subscriber mobile 180 and routes the call at 206 to the subscriber. In this manner, the O-MSC 120 routes the call to the R-MSC 160 based on the forward-to-number and the ICF flag of the profile information 124 and populates all the WNP related information properly in the outgoing signaling message for the call, wherein the routing includes parameters notifying the R-MSC 160 that the call relates to a ported number so that the R-MSC 160 need not redo the portability analysis.

Figure 4:
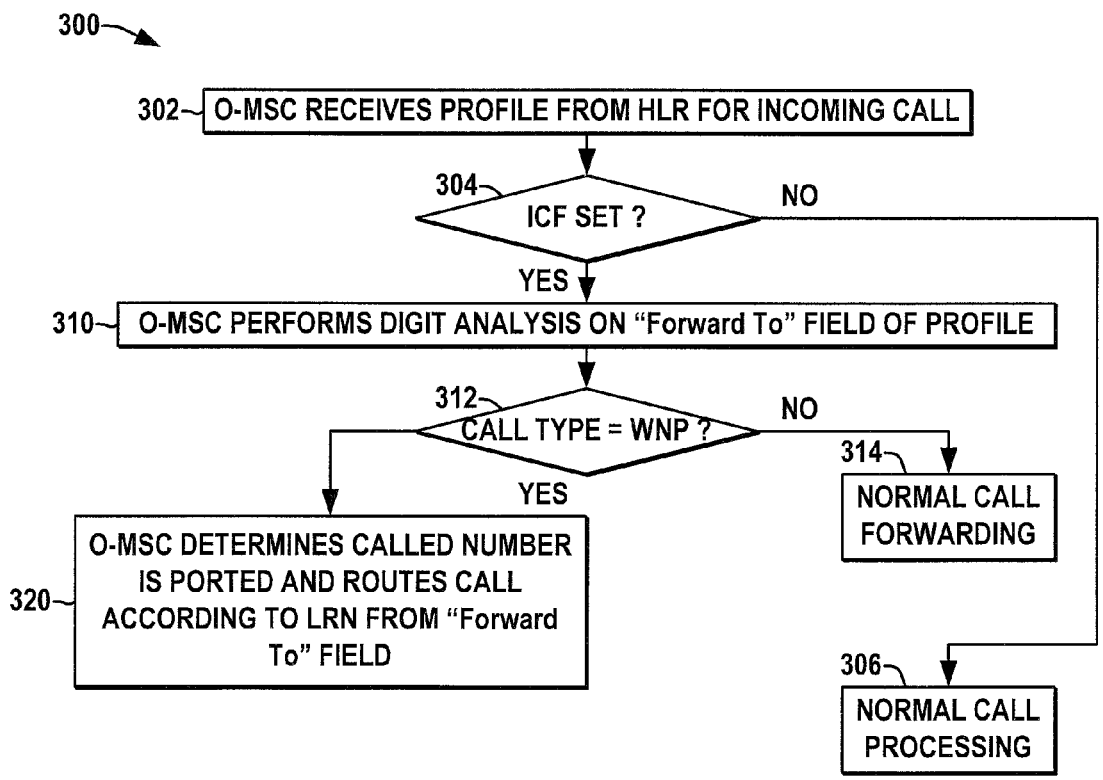
FIG. 4 a flow diagram illustrating an exemplary method according to further aspects of the invention.

FIG. 4 illustrates an exemplary method 300 in the originating MSC 120 for implementing number portability upon receiving an incoming call to a called number. At 302, the O-MSC 120 obtains profile information associated with the called number, from the HLR 122 or other source, and thereafter determines whether the called number is a ported number based on the profile information, and routes the call to the R-MSC 160 according to the profile information. In this example, moreover, the profile information includes a ported number indicator in the ICF field, the status of which the O-MSC determines at 304. If the ICF flag is not set (NO at 304), the O-MSC 120 determines that the number is not ported (and that no immediate call forwarding is enabled), and the method 300 proceeds with normal call processing at 306. If, however, the ICF flag is set (YES at 304), the O-MSC 120 performs digit analysis at 310 on the forward-to field of the profile information and makes a determination at 312 as to whether the call type is WNP (determines whether the forwarding of the call is to be according to normal immediate call forwarding or wireless number portability forwarding). If the call type is not WNP (NO at 312), normal immediate call forwarding is done at 314. Otherwise (YES at 312), the O-MSC 120 knows the call is to a ported MDN and routes the call at 320 according to the LRN from the forward-to field.

In this manner, the exemplary method 300 and the system 100 of FIG. 1 provide support for wireless number portability using existing network configurations, without the NP query operation between the originating MSC and a WNP-SCP, thereby simplifying the network configuration and lowering network maintenance costs for supporting WNP functionality. In addition, the call processing is greatly simplified compared to prior solutions, since the originating switch 120 uses the existing location request operations with the HLR 122 to obtain the receipt switch routing information which is equivalent to the LRN. The various aspects of the invention may thus be advantageously employed as a quick low cost solution to support WNP service, particularly for service providers in areas where number portability is used by only a small number of subscribers. Moreover, the implementation of the present invention can be easily accomplished by relatively small software modifications to the switching components, wherein the existing HLR record formats can be maintained and used for implementing WNP, with the switches being configured to provide for analysis of the HLR record to determine whether a number is ported based on an HLR response to a location request inquiry. In addition, the switching components may be configured to update the HLR record accordingly upon a mobile directory number being ported out to include a ported number indicator and a location routing number or other suitable profile information from which the originating switch can later determine that the MDN has been ported.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for implementing number portability at an originating switching component of a wireless communications network, the method comprising:
   an originating switching component receiving an incoming call to a called number;
   the originating switching component obtaining profile information associated with the called number, the profile information including a location routing number, wherein the profile information includes the location routing number in a forward-to field, and wherein the profile information includes a call type indicating that the forward-to field includes location routing information for a ported number;
   the originating switching component determining whether the called number is a ported number based on the profile information; and
   the originating switching component routing the incoming call to a receipt switching component according to the location routing number of the profile information.

2. The method of claim 1, wherein the profile information is obtained from a home location register associated with the originating switching component.

3. The method of claim 1, wherein the profile information includes a ported number indicator.

4. The method of claim 3, wherein the profile information includes the ported number indicator in an immediate call forwarding field, and wherein the profile information includes a call type indicating that the immediate call forwarding field indicates whether the called number is a ported number or not.

5. The method of claim 4, wherein the profile information includes the location routing number in a forward-to field, and wherein the call type indicates that the forward-to field includes location routing information for a ported number.

6. The method of claim 1, further comprising the originating switching component updating a home location register record for a ported number to include a ported number indicator and a location routing number.

7. The method of claim 6, wherein the home location register record for the ported number includes the ported number indicator in an immediate call forwarding field and includes the location routing number in a forward-to field.

8. A switching component of a wireless communications network, the switching component comprising:
   means for receiving an incoming call to a called number;
   means for obtaining profile information associated with the called number, the profile information including a location routing number, wherein the profile information includes the location routing number in a forward-to field, and wherein the profile information includes a call type indicating that the forward-to field includes location routing information for a ported number; and
   means for determining whether the called number is a ported number based on the location routing number of the profile information.

9. The switching component of claim 8, further comprising: means for routing the incoming call to a receipt switching component according to the profile information.

10. A system for implementing wireless number portability in a wireless communications network, the system comprising:
    an originating switching component operatively coupled with the network to receive an incoming call to a called number; and
    a home location register operatively coupled with the originating switching component and storing profile information associated with the called number, the profile information including a location routing number associated with the called number, wherein the profile information includes the location routing number in a forward-to field, and wherein the profile information includes a call type indicating that the forward-to field includes location routing information for a ported number;
    wherein the originating switching component is operative to obtain the profile information associated with the called number from the home location register and to determine whether the called number is a ported number based on the profile information; and
    wherein the originating switching component routes the incoming call to the receipt switching component according to the location routing number.

11. The system of claim 10, wherein the home location register provides the location routing number to the originating switching component in a forward-to field of the profile information, and wherein the profile information includes a call type indicating that the forward-to field includes location routing information for a ported number.

12. The system of claim 10, wherein the profile information includes a ported number indicator.

13. The system of claim 12, wherein the home location register provides the ported number indicator to the originating switching component in an immediate call forwarding field of the profile information, and wherein the profile information includes a call type indicating that the immediate call forwarding field indicates whether the called number is a ported number or not.

14. The system of claim 10, wherein the home location register comprises a record for the ported number including a ported number indicator in an immediate call forwarding field and a location routing number in a forward-to field.

15. The switching component of claim 8, wherein the profile information includes the location routing number in a forward-to field, and wherein the profile information includes a call type indicating that the forward-to field includes location routing information for a ported number.

16. The switching component of claim 8, wherein the profile information includes a ported number indicator.

17. The switching component of claim 16, wherein the profile information includes the ported number indicator in an immediate call forwarding field, and wherein the profile information includes a call type indicating that the immediate call forwarding field indicates whether the called number is a ported number or not.

18. A method for implementing number portability at an originating switching component of a wireless communications network, the method comprising:

- an originating switching component receiving an incoming call to a called number;
- the originating switching component obtaining profile information associated with the called number, the profile information including a location routing number;
- the originating switching component determining whether the called number is a ported number based on the profile information; and
- the originating switching component routing the incoming call to a receipt switching component according to the location routing number of the profile information;

wherein the originating switching component determines whether the called number is a ported number and routes the incoming call without a number portability database query.

19. A system for implementing wireless number portability in a wireless communications network, the system comprising:

- an originating switching component operatively coupled with the network to receive an incoming call to a called number; and
- a home location register operatively coupled with the originating switching component and storing profile information associated with the called number, the profile information including a location routing number associated with the called number;
- wherein the originating switching component is operative to obtain the profile information associated with the called number from the home location register and to determine whether the called number is a ported number based on the profile information;
- wherein the originating switching component routes the incoming call to the receipt switching component according to the location routing number; and
- wherein the originating switching component determines whether the called number is a ported number and routes the incoming call without a number portability database query.

* * * * *